United States Patent
Chopra et al.

(10) Patent No.: US 10,440,108 B1
(45) Date of Patent: Oct. 8, 2019

(54) SYSTEM AND METHOD FOR MANAGING STORAGE TIER MIGRATION

(71) Applicant: EMC IP Holding Company LLC, Hopkinton, MA (US)

(72) Inventors: Shelesh Chopra, Bangalore (IN); Gururaj Kulkarni, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 166 days.

(21) Appl. No.: 15/866,570

(22) Filed: Jan. 10, 2018

(51) Int. Cl.
| | |
|---|---|
| G06F 11/07 | (2006.01) |
| G06F 17/30 | (2006.01) |
| H04L 29/08 | (2006.01) |
| G06F 3/06 | (2006.01) |

(52) U.S. Cl.
CPC ........ *H04L 67/1095* (2013.01); *G06F 3/0647* (2013.01); *H04L 67/1023* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 9,098,525 B1 | 8/2015 | Mandic et al. | |
| 9,330,109 B2 * | 5/2016 | Bone | G06F 16/122 |
| 9,451,013 B1 | 9/2016 | Roth | |
| 9,531,809 B1 | 12/2016 | Brooker | |
| 9,740,435 B2 | 8/2017 | Dolce et al. | |
| 9,953,075 B1 * | 4/2018 | Reiner | G06F 16/285 |
| 9,977,704 B1 * | 5/2018 | Chopra | G06F 11/0709 |
| 10,089,148 B1 * | 10/2018 | Blitzer | G06F 11/14 |
| 10,180,912 B1 | 1/2019 | Franklin et al. | |
| 2006/0224852 A1 | 10/2006 | Kottomtharayil | |
| 2009/0260021 A1 | 10/2009 | Haenel | |
| 2011/0137870 A1 | 6/2011 | Feder et al. | |
| 2011/0314069 A1 * | 12/2011 | Alatorre | G06F 16/122 |
| | | | 707/827 |
| 2012/0059934 A1 | 3/2012 | Rafiq et al. | |
| 2014/0082167 A1 | 3/2014 | Robinson | |
| 2014/0281301 A1 * | 9/2014 | Reinoso | G06F 3/0604 |
| | | | 711/161 |
| 2014/0297950 A1 | 10/2014 | Kuwayama | |
| 2014/0380014 A1 * | 12/2014 | Moyer | G06F 3/067 |
| | | | 711/170 |

(Continued)

OTHER PUBLICATIONS

European Extended Search Report issued in corresponding EP Application No. 19150826.6, dated Apr. 5, 2019.

*Primary Examiner* — Natisha D Cox
(74) *Attorney, Agent, or Firm* — Chamberlain, Hrdlicka, White, Williams & Aughtry

(57) ABSTRACT

A storage gateway for managing data includes a persistent storage and a processor. The persistent storage includes data category mappings and data category storage policies. The processor obtains a data storage request for data from a client; assigns the data to a first category specified by the data category mappings; stores the data in a first storage based on a storage policy specified by the data category storage policies; and, after storing the data in the first storage, migrates the data to a second storage in response to a change in the association between the data category mappings and the data category storage policies.

20 Claims, 16 Drawing Sheets

(56) References Cited

U.S. PATENT DOCUMENTS

| | | |
|---|---|---|
| 2015/0154418 A1* | 6/2015 | Redberg ................ G06F 21/602 |
| | | 713/165 |
| 2015/0261468 A1 | 9/2015 | Khoyi et al. |
| 2016/0054922 A1 | 2/2016 | Awasthi et al. |
| 2016/0062795 A1 | 3/2016 | Hu et al. |
| 2017/0060695 A1 | 3/2017 | Clare |
| 2017/0093976 A1 | 3/2017 | Raghunath et al. |
| 2017/0168729 A1 | 6/2017 | Faulkner et al. |
| 2017/0351426 A1 | 12/2017 | Anderson et al. |
| 2018/0267830 A1* | 9/2018 | Rivera ................ G06F 9/45558 |
| 2018/0314429 A1 | 11/2018 | Thomas |

* cited by examiner

SYSTEM AND METHOD FOR MANAGING STORAGE TIER MIGRATION

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

SUMMARY

In one aspect, a storage gateway for managing data in accordance with one or more embodiments of the invention includes a persistent storage and a processor. The persistent storage includes data category mappings and data category storage policies. The processor obtains a data storage request for data from a client; assigns the data to a first category specified by the data category mappings; stores the data in a first storage based on a storage policy specified by the data category storage policies; and, after storing the data in the first storage, migrates the data to a second storage in response to a change in the association between the data category mappings and the data category storage policies.

In one aspect, a method of operating a storage gateway for managing data in accordance with one or more embodiments of the invention includes obtaining a data storage request for data from a client; assigning the data to a first category specified by data category mappings; storing the data in a first storage based on a storage policy specified by data category storage policies; and, after storing the data in the first storage, migrating the data to a second storage in response to a change in the association between the data category mappings and the data category storage policies.

In one aspect, a non-transitory computer readable medium in accordance with one or more embodiments of the invention includes computer readable program code, which when executed by a computer processor enables the computer processor to perform a method for operating a storage gateway for managing data. The method includes obtaining a data storage request for data from a client; assigning the data to a first category specified by data category mappings; storing the data in a first storage based on a storage policy specified by data category storage policies; and, after storing the data in the first storage, migrating the data to a second storage in response to a change in the association between the data category mappings and the data category storage policies.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
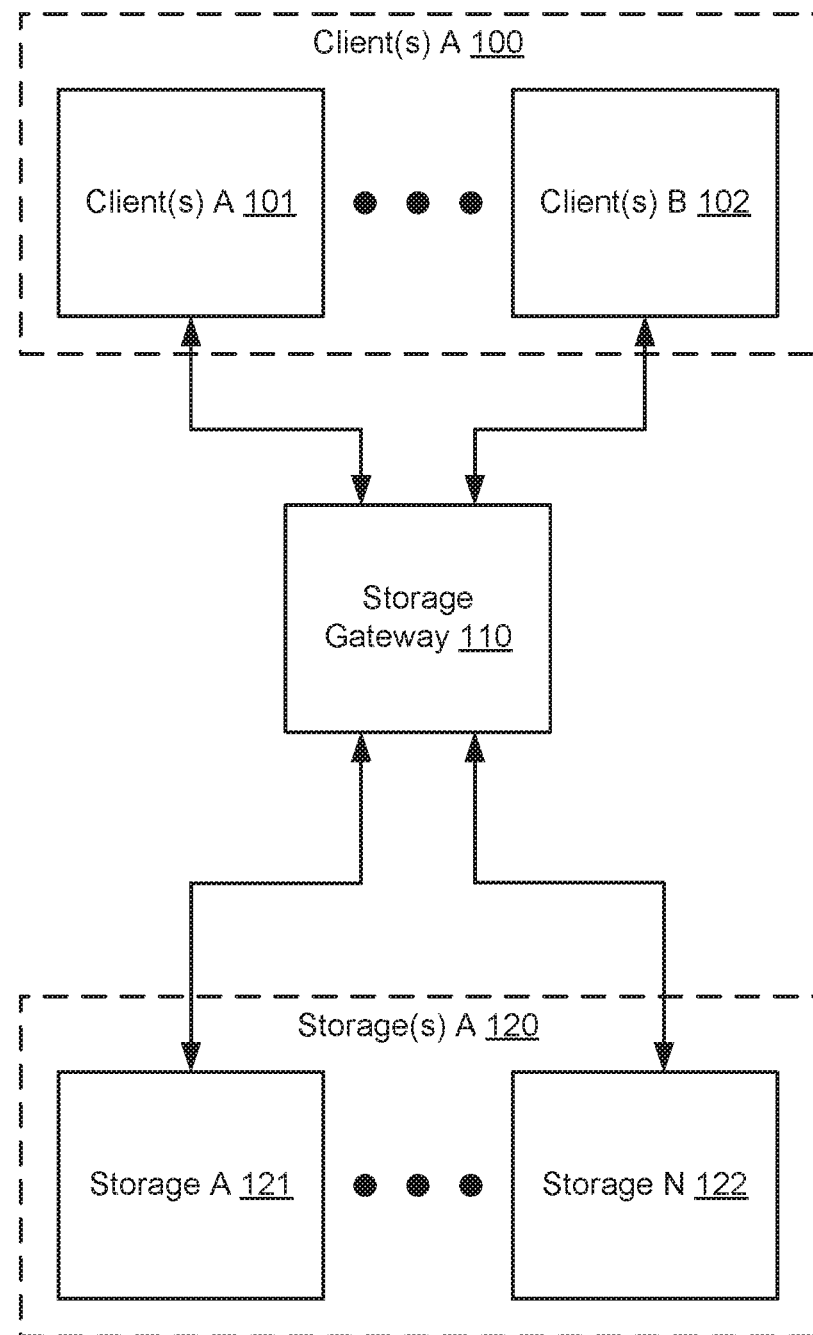
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data. More specifically, the systems, devices, and methods may store data from clients in storages. The storages may be remote from the clients to reduce the likelihood that a natural disaster or other event would wipe out all copies of the stored data.

In one or more embodiments of the invention, different storages provide different qualities of storage service to the clients. As used herein, quality of storage service refers to characteristics of the functionality of the storages that impacts the ability of the storages to store or provide data. For example, a quality of storage service may be the bandwidth between a client and a storage used to transfer data when storing or providing previously stored data. Storages having a higher bandwidth of connections to clients may store/provide data more quickly when compared to storages that have lower bandwidth of connections to clients.

In one or more embodiments of the invention, data stored in a first storage having a first quality of storage service may be migrated/replicated to a second storage having a second quality of storage service. For example, as stored data becomes less relevant the stored data may be migrated to a storage that provides a lower quality of storage service. Generally, storages that provide a lower quality of storage service consume fewer computing resources to store the data. In another example, a change in client needs for stored data may trigger replication of previously stored data to a second storage having a higher quality of storage service. The need from the client may be reflected in storage policies associated with stored data and, thus, the trigger may occur without client intervention. Generally, storages that provide a higher quality of storage service may store or provide data more quickly than storages that provide a lower quality of storage service.

As used herein, computing resources refer to processor computing cycles, communication bandwidth, transitory storage input-output cycles, persistent storage input-output cycles, and/or transitory or persistent memory storage capacity. Transitory storage may be provided by, for example, random access memory. Persistent storage memory may be provided by, for example, a solid state hard disk drive. Processor computing cycles may be provided by, for example, a central processing unit. Communication bandwidth may be provided by, for example, a network interface card.

In one or more embodiments of the invention, the system automatically migrate/replicate client data stored in the storages based on: (i) storage policies for different categories of data and (ii) data category mappings for stored data. As will be discussed in greater detail below, the aforementioned method of moving data may enable stored client data to be moved on a macro level rather than on a granular level.

In one or more embodiments of the invention, client data may be categorized at a time of storing the data. Categorizing the stored data may enable the categorized data to be migrated/replicated quickly and/or efficiently. Additionally, categorizing the stored data at a time of storage may dramatically reduce a cognitive burden on a user when attempting to change a quality of storage service provided to stored client data. In contrast, modifying a quality of storage service provided to stored client data on a granular level may be time consuming, inefficient, place a large cognitive burden on a user, and/or is fraught with potential for error.

FIG. 1A shows an example system in accordance with one or more embodiments of the invention. The system includes client(s) (100) that store data in storages (120) via a storage gateway (110). The storage gateway (110) manages storing of the client data in the storages (120) by storing the client data and/or migrating/replicating stored client data to other storages over time. The client data may be migrated and/or replicated to meet quality of storage service requirements for the stored client data. For example, due to changes in client needs for stored client data, the stored client data may be migrated/replicated to another storage that is able to meet the need of the client. The clients (100), storage gateway (110), and storages (120) may be operably connected to each other. The aforementioned components of the system may be connected by, for example, a network, a direct connection, or any other type of connection mechanism. Each component of the system is discussed below.

The clients (100) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (100) may be other types of computing devices without departing from the invention.

The clients (100) may be programmed to store data in the storages (120) via the storage gateway (110). By storing data in the storages (120), the clients (100) may store backup copies of data and/or reduce the storage utilization rate of the clients, e.g., utilize the storages (120) as a remote storage.

In one or more embodiments of the invention, the clients (100) store a copy of all or a portion of the respective client's data in the storages (120) via the storage gateway (110). In other words, the storage gateway (110) may be used to back up the client's data.

In one or more embodiments of the invention, the clients (100) store data in the storages (120) via the storage gateway (110). In other words, rather than storing data to a local storage, the clients (100) may store data in the storages (120) via the storage gateway (110) without making a local copy of the stored data.

While the clients (102, 104) are illustrated as being assigned to a single storage gateway (110), multiple groupings of clients may be assigned to any number of storage gateways without departing from the invention. Additionally, while the storage gateway (110) is illustrated as being operably connected/use all storages (120), the storage gateway (110) may only be operably connected/use a portion of the storages (120) without departing from the invention. For example, a system may include two groupings of clients, each grouping may be serviced by separate storage gateways, and each storage gateway may utilize different storages to store data. Further, in some embodiments of the invention, different storage gateways may utilizes different groupings of storages that share one or more storages between the storage groupings.

In one or more embodiments of the invention, the clients (100) may provide the storage gateway (110) with data category mappings, data category storage policies, and/or recovery plans. The aforementioned mappings, policies, and plans may be used by the storage gateway (110) to store/migrate/replicate client data. For additional details regarding the data category mappings, data category storage policies, and/or recovery plans, See FIGS. 2A, 2B, 2D, and 2E.

To facilitate managing data from the clients, the storage gateway (110) may store the client data in the storages (120). The storages (120) may be computing devices. The computing devices may be, for example, mobile phones, tablet computers, laptop computers, desktop computers, servers, distributed computing systems, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The storages (120) may be other types of computing devices without departing from the invention.

In one or more embodiments of the invention, the storages (120) may be distributed computing devices. As used herein, a distributed computing device refers to functionality provided by a logical device that utilizes the computing resources of one or more separate and/or distinct computing devices. For example, in one or more embodiments of the invention, the storages (120) may be distributed devices that include components distributed across a number of separate and/or distinct computing devices. In such a scenario, the functionality of the storages (120) may be performed by multiple different computing devices without departing from the invention.

The storages (120) may store client data or provide previously stored client data. The storages (120) may store or provide client data in response to requests from the storage gateway (110). In response to the requests, the storages (120) may take appropriate action to service the aforementioned storage/access requests from the storage gateway (110). Additionally, different storages may have different performance characteristics and/or connection characteristics that impact the quality of storage services provided by the storages. For example, different storages may be connected to clients using different connections that have different bandwidth limitations. In another example, different storages may store different types of data and provide different degrees of deduplication of client data. Thus, different storages may provide different qualities of storage service for stored client data depending on many different factors. For additional details regarding the storages (120), See FIG. 1C.

While the storages (121, 122) are illustrated as being operably connected to a single storage gateway (110), each storage may be operably connected to any number and/or combination of storage gateways without departing from the invention. In other words, each storage of the storages (120) may provide storage services for any number of storage gateways. For example, a system contemplated herein may include multiple storage gateways that each provides storage services to groups of clients. The groups may be different groups of clients (e.g., groups of unique members in each group) or partially different groups of clients (e.g., different groups of clients that have some clients as members of both groups).

As discussed above, the clients (100) may store/access data in the storages (120) via the storage gateway (110). In one or more embodiments of the invention, the storage gateway (110): (i) selects a location for storage of client data, (ii) categorizes client data as it is stored, (iii) migrates and/or replicates stored client data, and (iv) performs the migration/replication on a macro scale using the categorization of the client data and client storage policies. In one or more embodiments of the invention, the migration and/or replication may be performed to meet a client recovery plan. The client recovery plan may specify that a portion of the client data is used for disaster recovery purposes and the quality of storage service required for the specified portion of the client data.

In one or more embodiments of the invention, the storage gateway (110) is a computing device. The computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and the methods illustrated in FIGS. 4A-4D. The storage gateway (110) may be other types of computing devices without departing from the invention.

In one or more embodiments of the invention, the storage gateway (110) is a distributed computing device. As used herein, a distributed computing device refers to functionality provided by a logical device that utilizes the computing resources of one or more separate and/or distinct computing devices. For example, in one or more embodiments of the invention, the storage gateway (110) may be a distributed device that includes components distributed across a number of separate and/or distinct computing devices. In such a scenario, the functionality of the storage gateway (110) may be performed by multiple different computing devices without departing from the invention.

In addition to the above noted functionality of the storage gateway (110), the storage gateway (110) may also act as a system controller to orchestrate operations of the system illustrated in FIG. 1A. For example, the storage gateway (110) may issue data storage/deletion/access commands to the storages. In another example, the storage gateway (110) may issue migration and/or replication commands to the storages. Thus, the storage gateway (110) may act as a single point of contact for the clients (100) and orchestrate the operation of the system illustrated in FIG. 1A to provide data management services to the clients (100). For additional details regarding the storage gateway (110), See FIG. 1B.

Figure 1B:
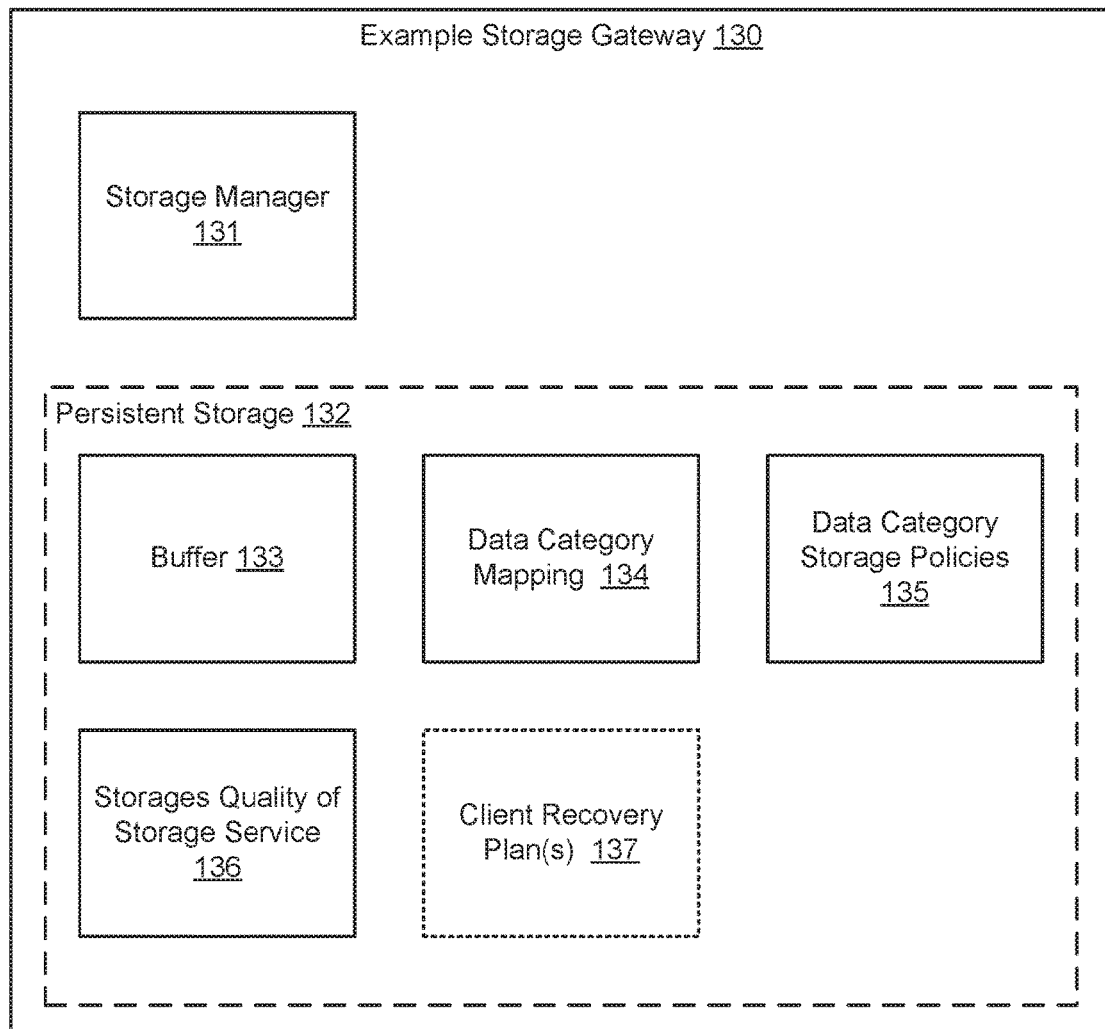
FIG. 1B shows a diagram of a storage gateway in accordance with one or more embodiments of the invention.
Figure 1C:
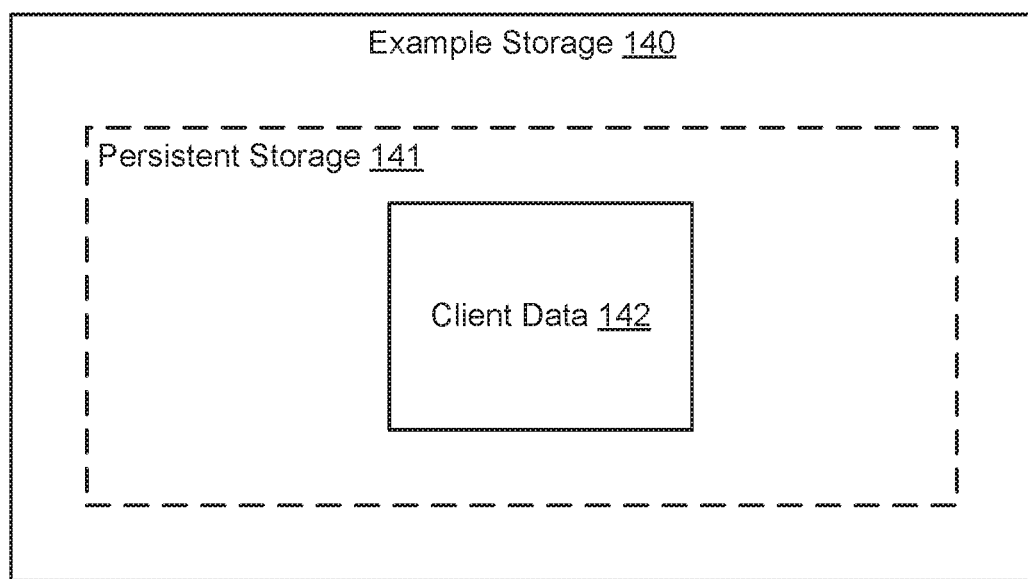
FIG. 1C shows a diagram of a storage in accordance with one or more embodiments of the invention.

To further explain embodiments of the invention, an example storage gateway (130) and an example storage (140) are illustrated in FIGS. 1B and 1C, respectively.

FIG. 1B shows an example storage gateway (130) in accordance with one or more embodiments of the invention. To provide the functionality of the storage gateway described with respect to FIG. 1A, the example storage gateway (130) may include a storage manager (131) and a persistent storage (132). The storage manager (131) may manage data from the clients. The persistent storage (132) may include a buffer (133) and store data structures used by the storage manager (131) to manage client data. The buffer (133) may be used to temporarily store client data in the storage gateway before storing the client data in the storages. Each component of the example storage gateway (130) is discussed below.

In one or more embodiments of the invention, to manage client data the storage manager (131): (i) stores/obtains data in/from the storages to service data storage/access requests from the clients, (ii) categorizes client data as it is stored and/or updates data structures that specify the categorization of the client data as the client data is stored, and (iii) migrates/replicates client data stored in the storages at a macro level. To provide portions of the aforementioned functionality, the storage manager (131) may perform the methods illustrated in FIGS. 4A-4D. The storage manager (131) may manage client data using additional, fewer, or different methods without departing from the invention.

In one or more embodiments of the invention, the buffer (133) stores copies of a portion of the client data stored in the storages. The storage manager (131) may preferentially retrieve copies of client data stored in the buffer (133) when servicing client request rather than retrieving copies of the client data stored in the storages.

In one or more embodiments of the invention, the storage manager (131) is implemented as a circuit. For example, storage manager (131) may be implemented as a field programmable gate array, application integrated circuit, digital signal processor, or analog circuit. The storage manager (131) may be implemented as other types of circuit without departing from the invention. The circuit may include circuit elements such as, for example, transistors, diodes, resistors, capacitors, and wiring arranged to provide the functionality of the storage manager (131) discussed throughout this application.

In one or more embodiments of the invention, the storage manager (131) is implemented as computer readable instructions stored on a non-transitory computer readable storage medium being executed by a processor. The computer readable instructions may cause the processor to perform the functions of the storage manager (131) discussed throughout this application.

In one or more embodiments of the invention, the persistent storage (132) is a physical device. The physical device may be, for example, a solid state hard drive, a disk drive, a tape drive, or other non-transitory storage medium. In some embodiments of the invention, the persistent storage (132) is a logical device that utilizes the physical computing resources of one or more other devices to provide data storage functionality. For example, the persistent storage (132) may be a logical storage that utilizes the physical storage capacity of disk drives of multiple, separate computing devices.

The persistent storage (132) may store a buffer (133) and data structures used by the storage manager (131). The data structures may include data category mappings (134), data category storage policies (135), storages quality of storage service (136), and/or client recovery plans (137). The persistent storage (132) may store additional, different, or less data without departing from the invention. The example storage gateway (130) may utilize the aforementioned data structures when performing the methods illustrated in FIGS. 4A-4C.

In one or more embodiments of the invention, the buffer (133) is a data structure stored in the persistent storage (132). The data structure may include copies of client data stored in the storages. In some cases, client data may be first stored in the buffer (133) and copies of the client data may be subsequently stored in the storages. Portions of the client data stored in the buffer (133) may be deleted and thereby result in a copy of only a portion of a client's data stored in the storages being maintained in the buffer (133). The storage manager (131) may include functionality to selectively delete portions of the data stored in the buffer (133) based on, for example, an estimated frequency of access of the stored data. In other words, the storage manager (131) may remove data that is estimated to be infrequently requested by the clients. The storage manager (131) may modify the data stored in the buffer (133) using other algorithms for selecting data for removal from the buffer (133) without departing from the invention.

In one or more embodiments of the invention, the data category mappings (134) is a data structure that includes information regarding in which category client data is mapped. In other words, the data category mappings (134) may include mappings between client data and a category to which client data is mapped. The data category mappings (134) may include any number of mappings and at any level of granularity. For example, the data category mappings (134) may include broad mappings that indicate that all data associated with a database is associated with a particular category. In another example, the data category mappings (134) may include narrow mappings that indicate that all files having a size of between 100-200 kilobytes are associated with a particular category. In a still further example, the data category mapping may map priority levels of the client data with different categories. The data structure may include information used by the storage manager (131) to manage client data. For additional details regarding the data category mappings (134), See FIG. 2A.

In one or more embodiments of the invention, the data category storage policies (135) is a data structure that includes information regarding the quality of storage service to which different categories of data specified by the data category mappings (134) are to be provided. For example, the data category storage policies (135) may specify that a first category of the data category mappings (134) are to be provided a first quality of storage service while a second category of the data category mappings (134) are to be provided with a second quality of storage service that is different from the first quality of storage service. The data category storage policies (135) may include any number of policies that associate any number of categories with different quality of storage service. The data structure may include information used by the storage manager (131) to manage client data. For additional details regarding the data category mappings (134), See FIG. 2B.

In one or more embodiments of the invention, the storages quality of storage service (136) is a data structure that includes information regarding the quality of storage service provided by different storages. The storages quality of storage service (136) may be dynamically updated to reflect the current quality of storage service provided by each storage. To maintain the temporal accuracy of the storages quality of storage service (136), the storage manager (131) may periodically update storages quality of storage service (136) or may update, when preparing to store data, the storages quality of storage service (136). The data structure may include information used by the storage manager (131) to manage client data. For additional details regarding the data category mappings (134), See FIG. 2C.

In one or more embodiments of the invention, the client recovery plans (137) is a data structure that includes information regarding the relative priority of client data stored in the storages for a recovery procedure of the client. The priority of the client data may be used by the storage gateway when categorizing client data at the time the client data is stored. The data structure may include information used by the storage manager (131) to manage client data. For additional details regarding the data category mappings (134), See FIGS. 2D-2E.

While not illustrated in FIG. 1C, the persistent storage (132) may include a data structure specifying the categorization of the client data stored in the storages. The categorization may be at any level of granularity. For example, the data may be categorized at a file level. In another example, the data may be categorized at a block level. In a still further example, the data may be categorized at a client, i.e., owner, level.

FIG. 1C shows an example storage (140) in accordance with one or more embodiments of the invention. The example storage (140) may store data, i.e., client data (142) from storage gateways or provide stored data to storage gateways in response to requests from the storage gateways. Additionally, copies of data from other storages, i.e., client data this is migrated or replicated from another storage, may be stored in the example storage (140).

In one or more embodiments of the invention, the example storage (140) includes a persistent storage (141). The persistent storage (141) may be a physical device. The physical device may be, for example, a solid state hard drive, a disk drive, a tape drive, or other non-transitory storage medium. In some embodiments of the invention, the persistent storage (141) may be a logical device that utilizes the physical computing resources of one or more other devices to provide data storage functionality. For example, the persistent storage (141) may be a logical storage that utilizes the physical storage capacity of disk drives of multiple, separate computing devices.

In one or more embodiments of the invention, the persistent storage (141) stores the client data (142). As discussed with respect to FIG. 1B, when client data (142) is stored in the example storage (140) the stored data may be categorized. While not illustrated in FIG. 1C, the persistent storage (141) may include a data structure specifying the categorization of the client data (142). The categorization may be at any level of granularity. For example, the data may be categorized at a file level. In another example, the data may be categorized at a block level. In a still further example, the data may be categorized at a client, i.e., owner, level.

The client data (142) may include data of any format and/or combination of formats. For example, the aforementioned data may include text file, audio visual file, database files, and/or unstructured data. The data may include other types of data without departing from the invention.

In one or more embodiments of the invention, the client data (142) may be deduplicated before storage in the persistent storage (141). In other words, data from the clients may be deduplicated against other data stored in the persistent storage (141), including previously stored client data, before the data from the clients is stored in the persistent storage (141).

As used herein, deduplication refers to a process that attempts to reduce the required amount of storage space used to store data by not storing multiple copies of the same files or bit patterns. Deduplication balances the input-output (IO) limits of the physical devices used to store data against the benefit of reduced storage space requirements by only comparing the to-be-stored data to a portion of all of the data stored in the location where the to-be-stored data will be stored.

To deduplicate data, the to-be-stored data may be broken down into segments. The segments may correspond to portions of the to-be-stored data. Fingerprints that identify each segment of the to-be-stored data may be generated. The generated fingerprints may be compared to a portion of pre-existing fingerprints associated with a portion of the data already stored in the storage. Any segments of the to-be-stored data that do not match a fingerprint of the portion of the data already stored in the storage may be stored in the storage, the other segments are not stored in the storage. A file recipe to generate the now-stored data may be generated and stored so that the now-stored data may be retrieved from the storage. The recipe may include information that enables all of the segments of the to-be-stored data that were stored in the storage and all of the segments of the data already stored in the object storage having fingerprints that matched the fingerprints of the segments of the to-be-stored data to be retrieved from the object storage.

As used herein, a fingerprint may be a bit sequence that virtually uniquely identifies a segment. As used herein, virtually uniquely means that the probability of collision between each fingerprint of two segments that include different data is negligible, compared to the probability of other unavoidable causes of fatal errors. In one or more embodiments of the invention, the probability is 10^-20 or less. In one or more embodiments of the invention, the unavoidable fatal error may be caused by a force of nature such as, for example, a tornado. In other words, the fingerprint of any two segments that specify different data will virtually always be different.

In one or more embodiments of the invention, a fingerprint of a bit sequence is generated by obtaining a hash of the bit sequence. The hash may be generated using, for example, secure hashing algorithm (SHA) 1. Other hashing algorithms may be used without departing from the invention.

The process of deduplication of data, discussed above, utilizes computing resources including processing cycles, storage IO, and/or network communications bandwidth. The particular type of deduplication implemented by the storage impacts the quality of storage service provided by the example storage (140). One or more embodiments of the invention may ensure that client data is stored in a storage to meet quality of storage service requirements of the data and provide method of migrating/replicating client on a macro level to meet quality of storage service requirements.

As discussed above, to manage client data the storage gateway may utilize storages to store the client data. The storages may be separate devices operably connected to the storage gateway and each storage may provide a different quality of storage service. Additionally, storages may be dynamically added or removed from the system. Thus, when data is stored in the storages the storage gateway may migrated/replicated dynamically throughout the storage life of the client data as the topology of the system changes.

Figure 2A:
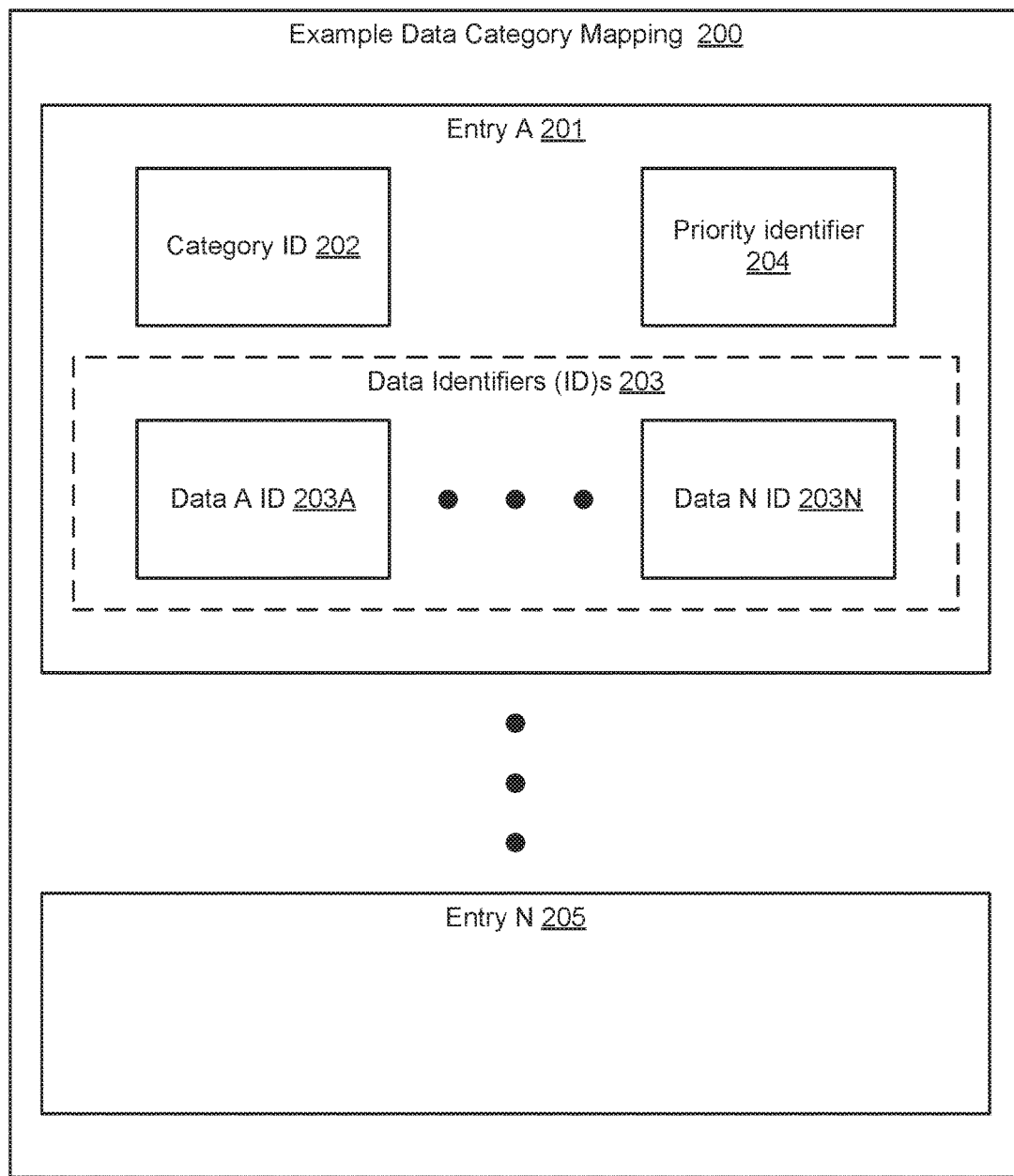
FIG. 2A shows a diagram of an example of data category mappings in accordance with one or more embodiments of the invention.
Figure 2B:
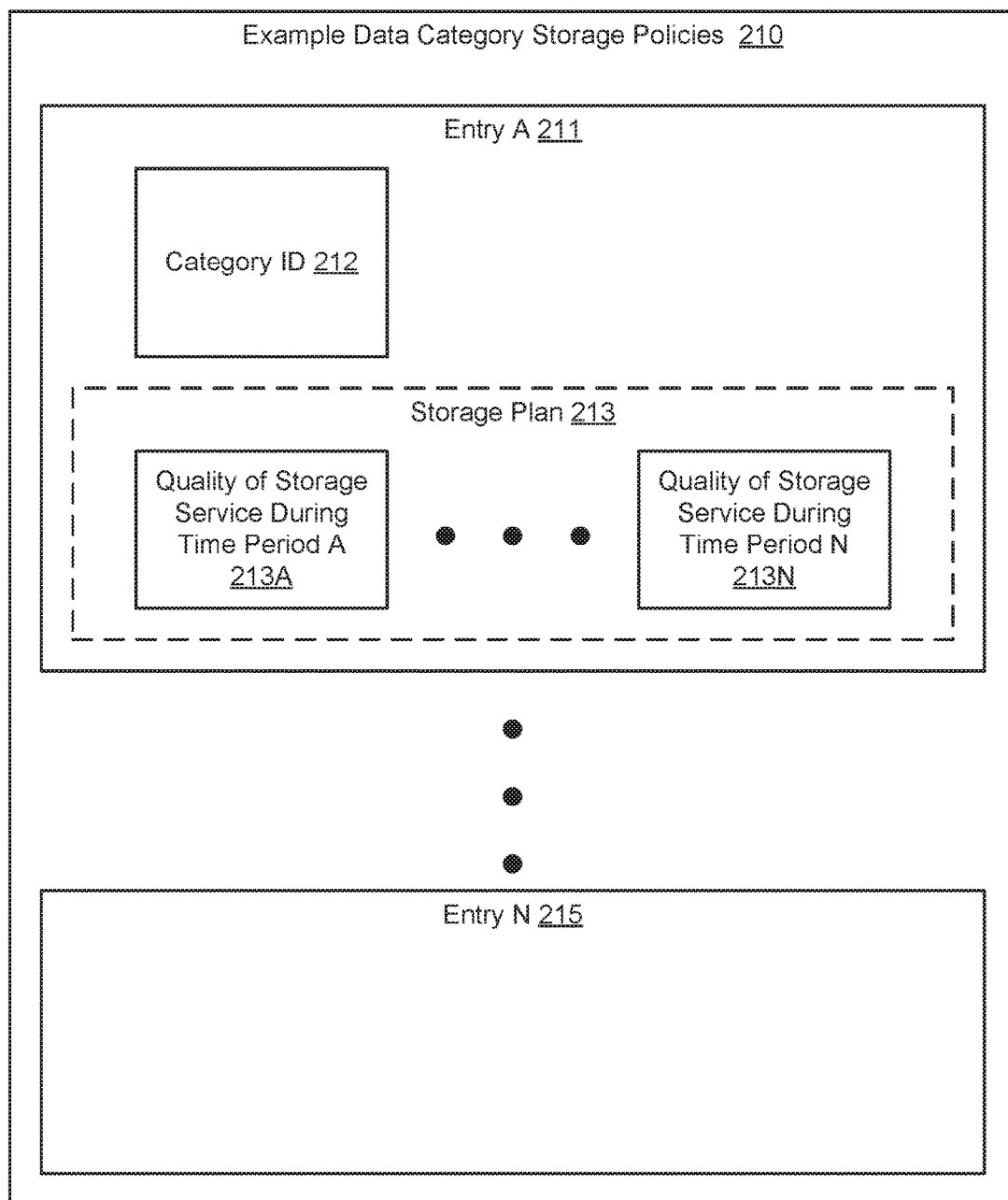
FIG. 2B shows a diagram of an example of data category storage policies in accordance with one or more embodiments of the invention.
Figure 2C:
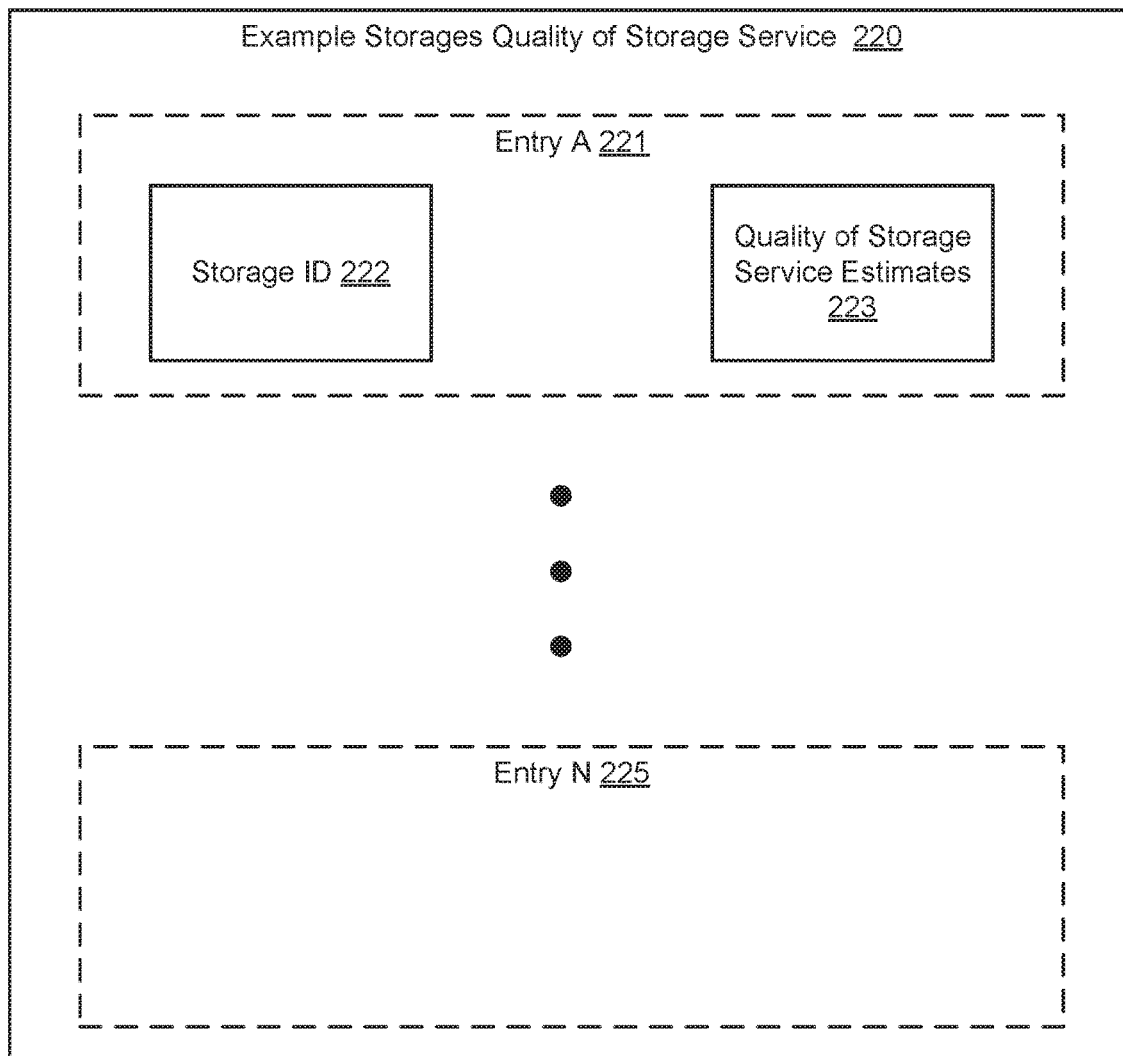
FIG. 2C shows a diagram of an example of storages quality of storage service in accordance with one or more embodiments of the invention.

When storing, migrating, and/or replicating data, the system illustrated in FIG. 1A may utilize data structures that specify the quality of storage service provided by the storages, categorizations of the stored client data, and required qualities of storage service for the stored client data. FIGS. 2A-2C show examples of the aforementioned data structures used by the system illustrated in FIG. 1A.

FIG. 2A show example data category mappings (200) in accordance with one or more embodiments of the invention. The aforementioned mappings may be utilized by the system of FIG. 1A when storing, migrating, and/or replicating client data.

The example data category mappings (200) may include entries (201, 205) associated with respective categories. Each entry (201, 205) may include a category identifier (202) that identifies the category to which the entry is associated.

In one or more embodiments of the invention, each entry (201, 205) may also be associated with a different priority by including a priority identifier (204). As discussed with respect to FIG. 2B, a recovery plan may specify the relative priority of client data. Thus, based on recovery plan, all client data may be associated with different levels of priority. The different levels of priority maybe, in turn, used to identify entries associated with the same level of priority.

Thus, categorizing client data base on priority may enable the client data associated with the category to be identified on a macro level via the mappings.

In one or more embodiments of the invention, each entry (201, 205) may include data identifiers (203) for the associated category. The data identifiers (203) may include identifiers of data that is associated with the category. In other words, each mapping may specify, at a granular level, the data associated with the category of the mapping. Each of the data identifiers (203A, 203N) may identify any quantity of data. For example, each of the data identifiers (203A, 203N) may identify a data block, a data fragment, a file, and/or a volume of file. Thus, any quantity of data at any level of granularity may be identified by the data identifiers (203) without departing from the invention.

In one or more embodiments of the invention, the data identifiers (203) are generated by the storage gateway when client data is stored. When storing the client data, the storage gateway may store an identifier provided by the storage in which the client data is stored as the data identifier for the data. The data identifiers (203) may be generated by other entities without departing from the invention.

FIG. 2B show example data category storage policies (210) in accordance with one or more embodiments of the invention. The aforementioned policies may be utilized by the system of FIG. 1A when storing, migrating, and/or replicating client data.

The example data category storage policies (210) may include entries (211, 215) associated with respective categories. Each entry (211, 215) may include a category identifier (212) that identifies the category to which the entry is associated.

Each entry (211, 215) may also include a storage plan (213) for the associated category. The storage plan (213) may specify the quality of storage service required for client data that is associated with the category to which the entry is associated.

For example, the storage plan (213) may specify for the associated category one or more of: (i) a minimum deduplication rate for client data, (ii) a maximum computing resource cost of storing the client data, (iii) a maximum amount of time allowed to provide the client data in response to data access requests, (iv) a maximum allowed cost for storing the client data, (v) a target cost for storing the client data, (vi) a minimum bandwidth/latency between a storage location of the client data and a client, and (vii) a maximum summated cost of storing the client data, i.e., the summed cost of storing the client data in each storage in which it was stored up to a point in time. The storage plan (213) may specify additional, fewer, or different requirements for the quality of storage service for the client data without departing from the invention.

In one or more embodiments of the invention, the storage plan (213) are specified for different periods of time. For example, the storage plan (213) for the associated client data may include a number of quality of storage service requirements for different time periods (213A, 213N). In other words, the required quality of storage service for the client data may change over time. For example, during a first year of the storage life of data, the storage plan may specify a small amount of time for retrieving the client data while in the second and later years of the storage life of the client data the storage plan may specify a large amount of time for retrieving the data. The periods of time may be of any length and/or different lengths without departing from the invention.

In one or more embodiments of the invention, the storage plans (213) are generated by the clients. The clients may send the storage plan (213) to the storage gateway which, in turn, aggregates the storage plans. For example, a client may have a storage plan for the data at the time of storage of the data and may notify the storage gateway of the requirements at the time of storage.

While not illustrated in FIG. 2B, each client may specify different storage policies for different categories of client data. The storage plan (213) may specify the respective policies for each client and apply the aforementioned policies when storing, migrating, and/or replicating client data from the respective clients.

FIG. 2C show example storage quality of storage service (220) in accordance with one or more embodiments of the invention. The aforementioned storage service may be utilized by the system of FIG. 1A when storing, migrating, and/or replicating client data.

The example storage quality of storage service (220) may include entries (221, 225) associated with respective storages. Each entry (201, 205) may include a storage identifier (222) that identifies the category to which the entry is associated.

Each entry (201, 205) may also include quality of storage service estimates (223) for the associated storage. The quality of storage service estimates (223) may indicate a quality of storage service which the associated storage is estimated to provide.

In one or more embodiments of the invention, the quality of storage service estimates (223) are based on historically provided quality of storage service provided by the associated storage. For example, the quality of storage service estimates (223) may be an average of the quality of storage service provided by the associated storage over a predetermined period of time. The predetermined period of time may be, for example, one day, one week, one month, six months, or one year.

In one or more embodiments of the invention, the quality of storage service estimates (223) are based on the computing resource available to the associated storage. For example, the quality of storage service estimates (223) may be based on the available computing cycles, the available input-output, or other factors.

In one or more embodiments of the invention, the quality of storage service estimates (223) are a relative ranking of the ability of each storage to provide data storage services. For example, the capacity of each storage to provide storage services may be ranked based on the performance of each storage over a predetermined period of time. The predetermined period of time may be, for example, one day, one week, one month, six months, or one year.

In one or more embodiments of the invention, the quality of storage service estimates (223) are generated by the storage gateway. For example, the storage gateway utilizes a storage the storage gateway may monitor a quality of storage service provided during the utilization and update the quality of storage service estimates (223) based on the monitoring.

Figure 2D:
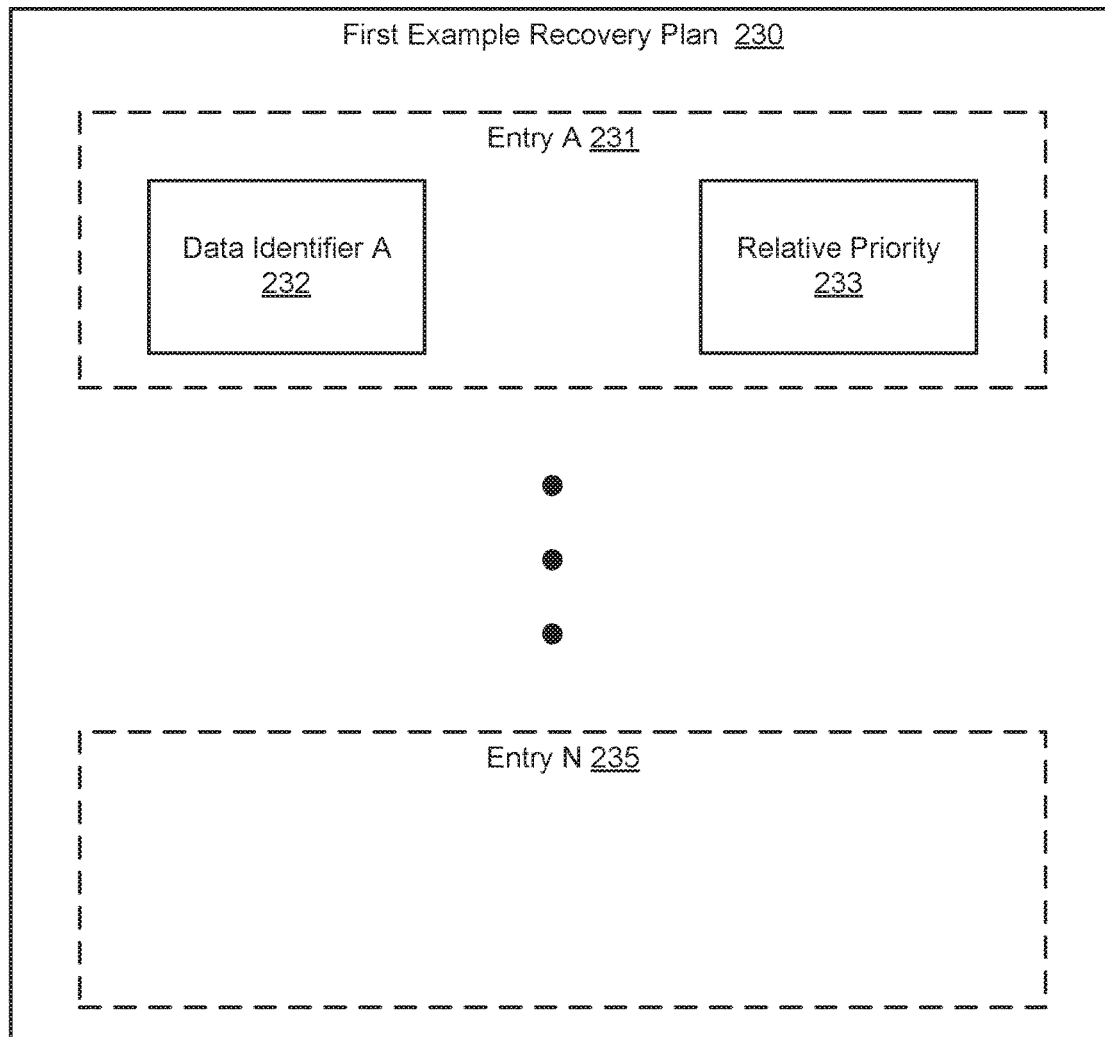
FIG. 2D shows a diagram of a first example recovery plan in accordance with one or more embodiments of the invention.
Figure 2E:
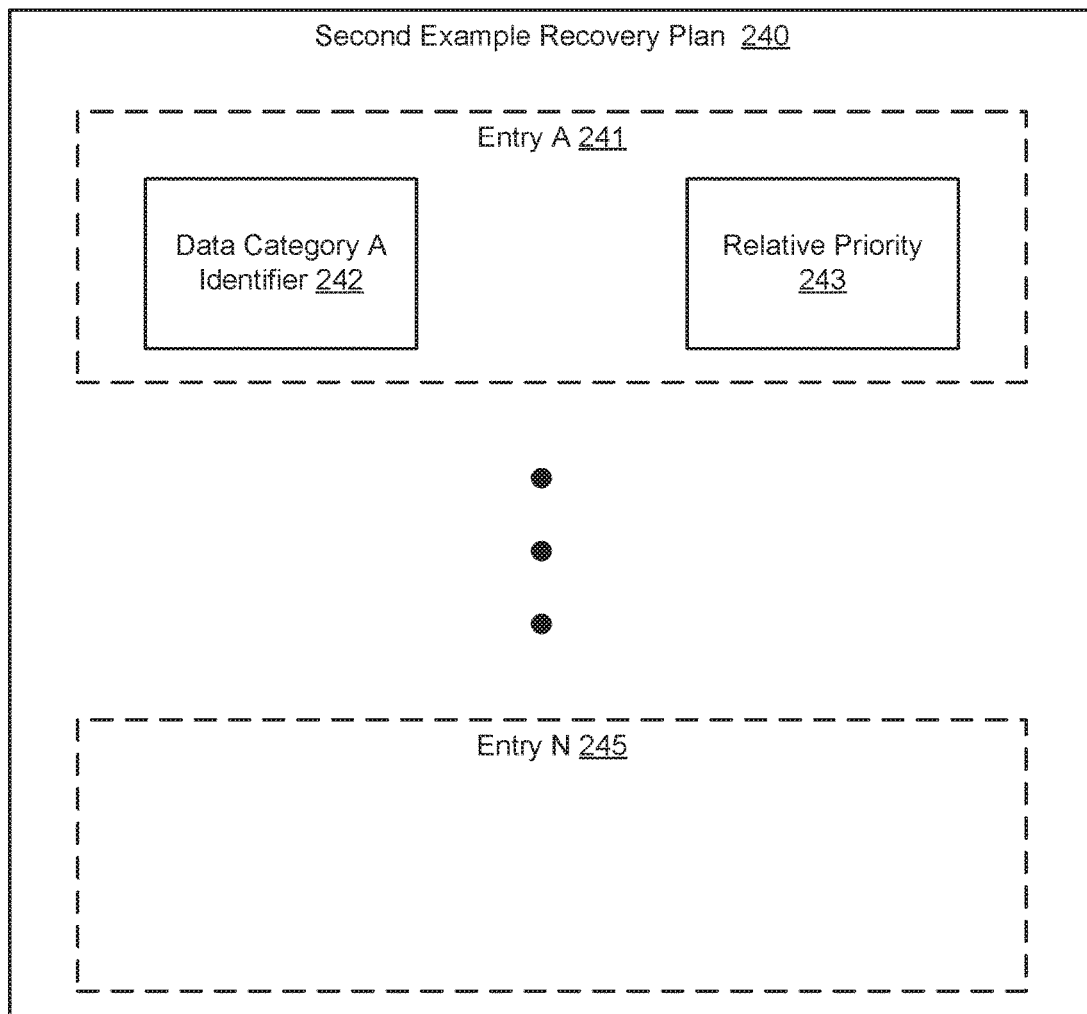
FIG. 2E shows a diagram of a second example recovery plan in accordance with one or more embodiments of the invention.

When generating the example data category mappings (200, FIG. 2A), the storage gateway may utilize priorities of client data specified by the client. In other words, the storage gateway may automatically categorize data and generate category mappings when storing client data in the storages. In one or more embodiments of the invention, the priorities of the client data are based on a recovery plan provided to the storage gateway by the client. FIGS. 2D and 2E show examples of recovery plans. However, the priorities of the client data may be specified different, at higher or lower levels of granularity, and/or for different reasons, i.e., other than for disaster recovery purposes, without departing from the invention.

FIG. 2D show a first example recovery plan (230) in accordance with one or more embodiments of the invention. The aforementioned recovery plan may be utilized by the system of FIG. 1A when storing, migrating, and/or replicating client data.

The first example recovery plan (230) may include entries (231, 235) associated with respective data. Each entry (231, 235) may include a data identifier (232) that identifies the data to which the entry is associated. The data identifier (232) may specify data at any level of granularity. For example, the data identifier (232) may specify a data block, a data fragment, or a data file.

Each entry (231, 235) may also include a relative priority (233) for the associated data. The relative priority (233) may indicate a relative priority of the associated data when compared to other data of the client.

FIG. 2E show a second example recovery plan (240) in accordance with one or more embodiments of the invention. The aforementioned second example recovery plan may be utilized by the system of FIG. 1A when storing, migrating, and/or replicating client data.

The second example recovery plan (240) may include entries (241, 245) associated with respective data categories. Each entry (241, 245) may include a data category identifier (242) that identifies the data to which the entry is associated. The data category identifier (242) may specify categories of data at any level of granularity. For example, the data category identifier (242) may specify a file type (e.g., text file, audio file, executable file, library file, etc.), a subset of a file type (e.g., a first database type, a second database type, etc.), or an association between files (e.g., usable by a first operating system, usable by a second operating system, etc.).

Each entry (241, 245) may also include a relative priority (243) for the associated data category. The relative priority (243) may indicate a relative priority of the data of the associated data category when compared to other data of other categories of the client. For example, a client may store data from windows machines that are used by low level users and data from a Linux machine that is used to run a backend database of the client. The relative priority for the data from the Linux machine may have a high priority relative to the data of the windows machines.

While the data structures illustrated in FIGS. 2A-2E are shown as lists of entries, the data structures may be stored in other formats, may be divided into multiple data structures, and/or portion of the data structures may be distributed across multiple computing devices without departing from the invention.

Figure 3:
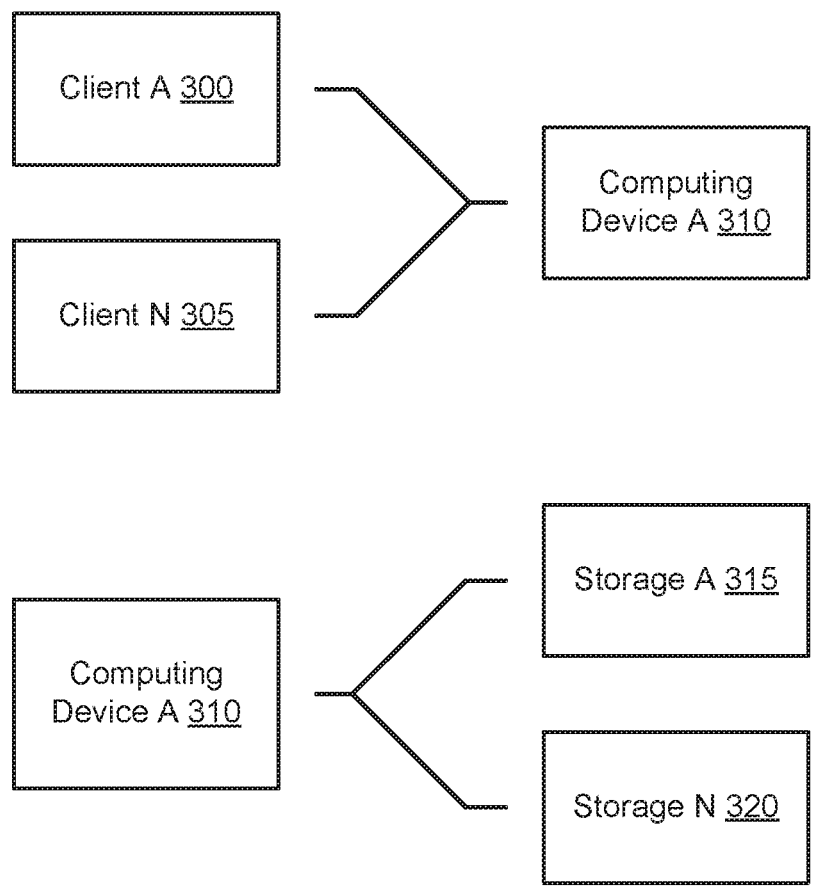
FIG. 3 shows a diagram of system relationships in accordance with one or more embodiments of the invention.

To further clarify relationships between components of the system of FIG. 1A, FIG. 3 shows a relationship diagram. As seen from the diagram, any number of clients (300, 305) may be served by a storage gateway (310), e.g., a N to one relationship. Similarly, a storage gateway (310) may utilize any number of storages (315, 320), e.g., a one to N relationship.

As discussed above, the storage gateway (110, FIG. 1A) may manage client data. FIGS. 4A-4D show methods in accordance with one or more embodiments of the invention that may be used manage client data.

Figure 4A:
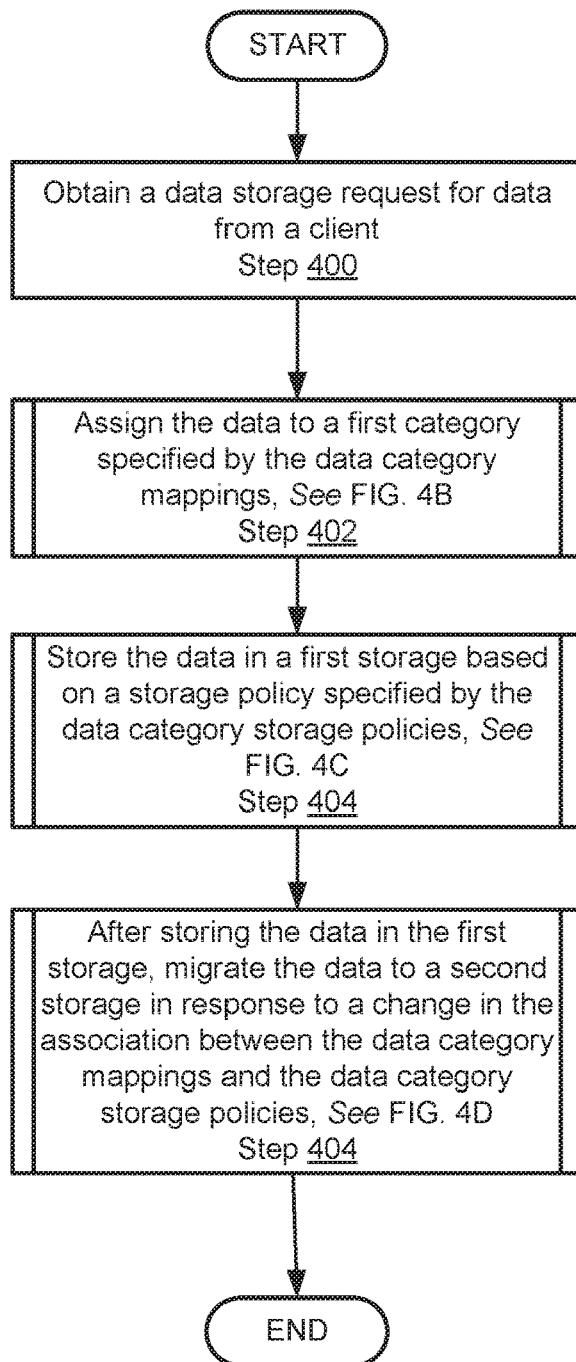
FIG. 4A shows a flowchart of a method of operating a storage gateway in accordance with one or more embodiments of the invention.
Figure 4B:
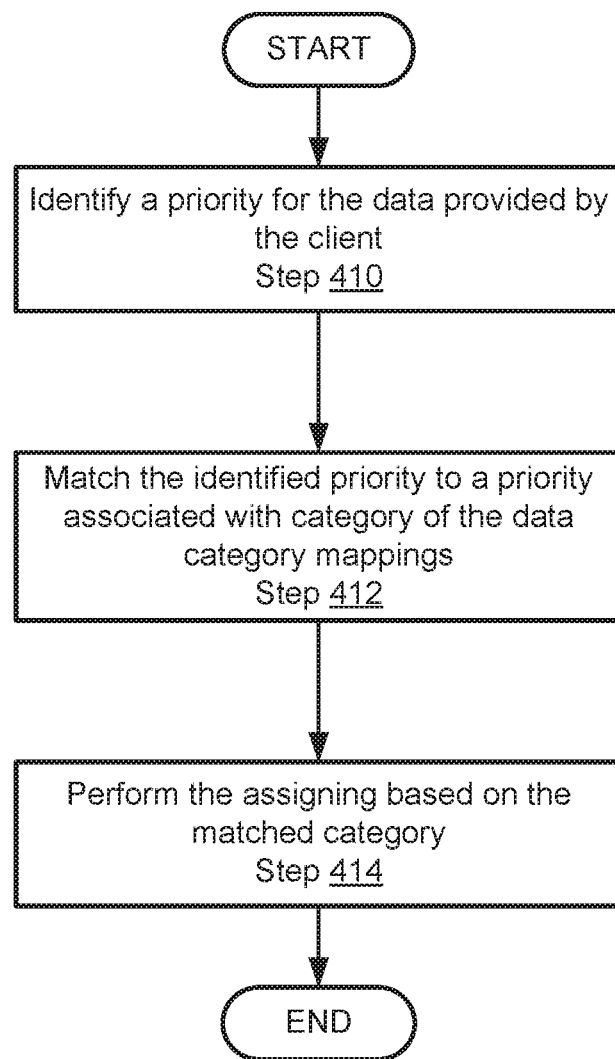
FIG. 4B shows a flowchart of a method of assigning data in accordance with one or more embodiments of the invention.
Figure 4C:
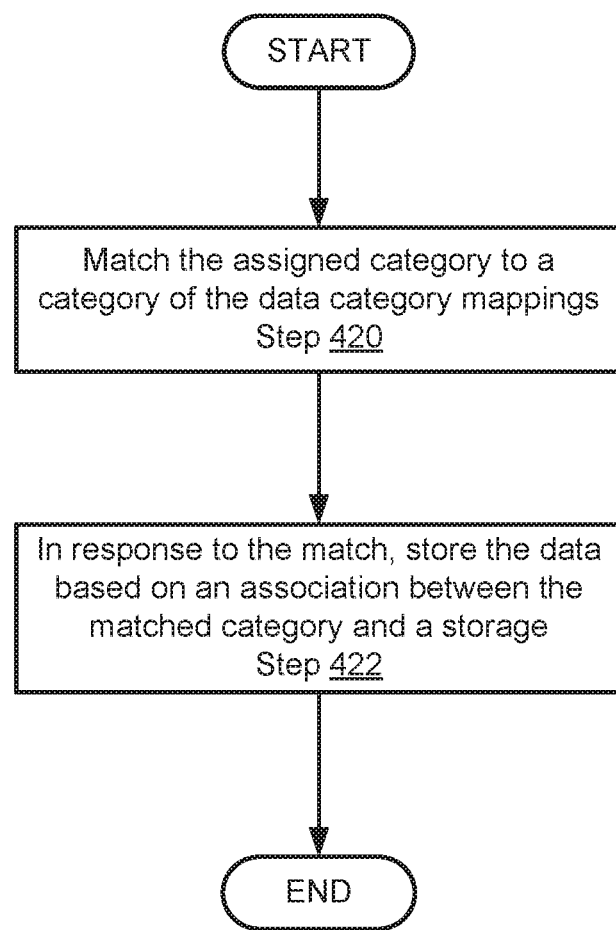
FIG. 4C shows a flowchart of a method of storing data in accordance with one or more embodiments of the invention.

While illustrated as separate methods, each of the methods illustrated in FIGS. 4A-4C may be performed sequentially or in parallel (or a combination of both serial and parallel execution) without departing from the invention. Further, one of ordinary skill will appreciate that some or all of these steps may be executed in different orders, may be combined or omitted, and some or all of the steps may be executed in parallel.

FIG. 4A shows a flowchart of a method in accordance with one or more embodiments of the invention. The method depicted in FIG. 4A may be used to manage client data in accordance with one or more embodiments of the invention. The method shown in FIG. 4A may be performed by, for example, a storage gateway (110, FIG. 1A). Other component of the system illustrated in FIG. 1A may perform the method of FIG. 4A without departing from the invention.

In Step 400, a data storage request is obtained from a client. The storage request may specify data from the client to be stored in a storage.

In Step 402, the data of the data storage request is assigned to a first category specified by data category mappings.

In one or more embodiments of the invention, the data is assigned to the first category via the method illustrated in FIG. 4B. The data may be assigned via other methods without departing from the invention.

In Step 404, the data is stored in the first storage based on a data storage policy associated with the first category.

In one or more embodiments of the invention, the first storage may be associated with the first category by a data category storage policy (e.g., 135, FIG. 1B). The data category storage policy may provide storage policies for each category of data. For example, by virtue of being assigned to a first category specified by data category mappings (e.g., 134, FIG. 1B) the data category storage policy (e.g., 135, FIG. 1B) may specify that all data mapped to the first category is stored in the first storage.

In one or more embodiments of the invention, the data is stored via the method illustrated in FIG. 4C. The data may be stored via other methods without departing from the invention.

In Step 406, the stored data is migrated to a second storage in response to a change in the association between the data category mappings and the data category storage policies after storing the data in the first storage.

In one or more embodiments of the invention, the change in association is caused by an update to the data category storage policies. The change may be initiated by a client. As discussed above, the data category storage policies may be set by a client. Due to changing circumstances, a client may change the data category storage policies. Upon change of the data category storage policies, the storage gateway may initiate migration of the data to another storage to meet the requirements of the data category storage policies.

In one or more embodiments of the invention, the change in data category mappings specifies a change in the data category storage policies. The change may be, for example, a change to a data category storage policy. The change may be a modification of the required quality of storage service for the policy. For example, the modification of the required quality of storage service for the policy may be a reduction in the amount of time allowed for data to be provided in response to a request for the data.

In one or more embodiments of the invention, the change in data category mappings specifies a change in the data category mappings. The change may be, for example, a change in the mapping between stored data and a category. The change may cause data previously associated with a first category to be associated with a second category.

Figure 4D:
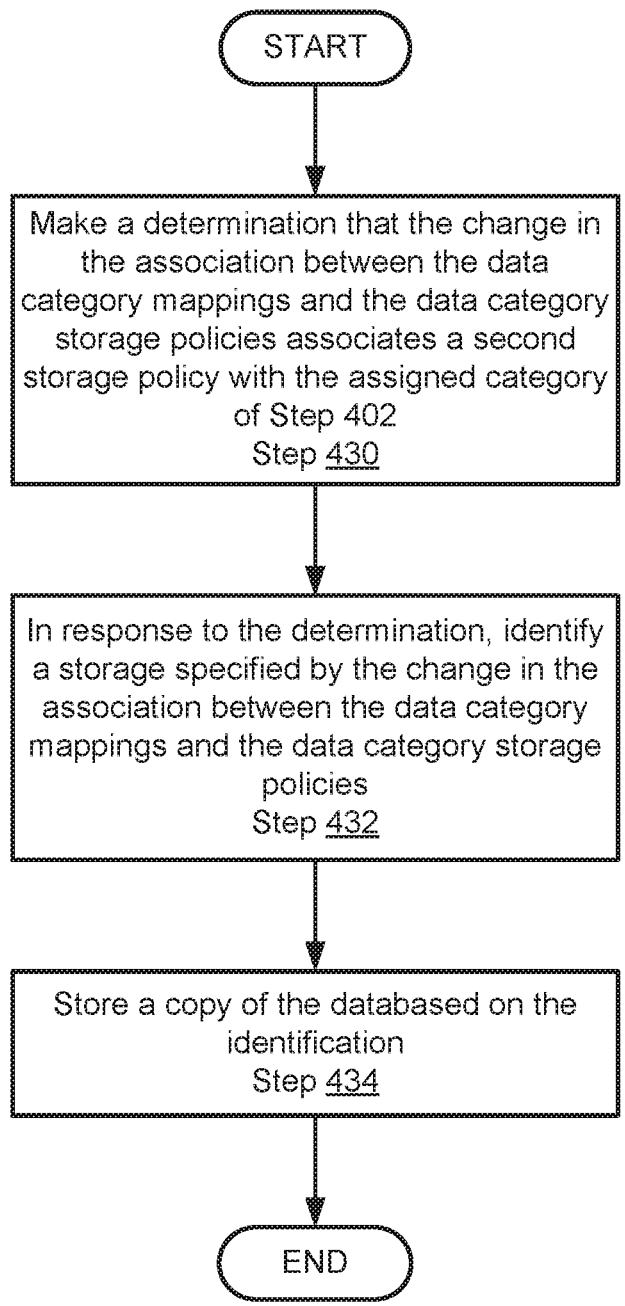
FIG. 4D shows a flowchart of a method of migrating data in accordance with one or more embodiments of the invention.

In one or more embodiments of the invention, the data is migrated via the method illustrated in FIG. 4D. The data may be migrated via other methods without departing from the invention.

In one or more embodiments of the invention, the migration of the stored data may occur as part of a migration of all data associated with a category. For example, a change to the storage policy of the stored data may result in a change in storage policy of additional data. Thus, the migration may be a macro level migration of all data associated with a particular storage policy or data categorization.

In one or more embodiments of the invention, the second storage is selected based on the quality of storage service provided by the second storage. For example, the migration may be triggered due to a change in quality of storage service required for the data. The new required quality of storage service may be compared the storages quality of storage service (e.g., 136, FIG. 1B) and a storage service providing the new required quality of storage service may be selected as the second storage.

The method may end following Step 406.

FIG. 4B shows a flowchart of a method in accordance with one or more embodiments of the invention. The method depicted in FIG. 4B may be used to assign data to a category in accordance with one or more embodiments of the invention. The method shown in FIG. 4B may be performed by, for example, a storage gateway (110, FIG. 1A). Other component of the system illustrated in FIG. 1A may perform the method of FIG. 4B without departing from the invention.

In Step 410, a priority for the client data of Step 400 is identified.

In one or more embodiments of the invention, the priority for the client data is identified using a recovery plan for the client. The recovery plan may specify the priority for the data, as described with respect to FIGS. 2D and 2E.

In Step 412, the identified priority is matched to a priority associated with a data category of the data category mappings. For example, as described with respect to FIG. 2A, each category, e.g., each entry, may be associated with a different priority. The category having the same priority as the identified priority may be selected as the match.

In Step 414, the assigning of Step 402 is performed based on the matched category of Step 412. In other words, the matched category is used as the first category in Step 402.

The method may end following Step 414.

FIG. 4C shows a flowchart of a method in accordance with one or more embodiments of the invention. The method depicted in FIG. 4C may be used to store data in a first storage in accordance with one or more embodiments of the invention. The method shown in FIG. 4C may be performed by, for example, a storage gateway (110, FIG. 1A). Other component of the system illustrated in FIG. 1A may perform the method of FIG. 4C without departing from the invention.

In Step 420, the category assigned in Step 404 is matched to a category specified by the data storage data category mappings.

In one or more embodiments of the invention, the match is performed by identifying a category of the assigned category and identifying a corresponding entry in the data category mappings.

In Step 422, the data is stored based on an association between the matched category and a storage in response to the match of Step 420.

In one or more embodiments of the invention, the association is specified by data category storage policies. The storage policies, e.g., the entries, may each be associated with a different category. Each storage policy may include a storage plan. The storage plan may specify a quality of storage service required for all data associated with the policy. Based on the required quality of storage service, a storage may be selected that meets the required quality of storage service for the data. The data may be stored in the storage meeting the quality of storage service requirement of the matched data category storage policy.

The method may end following Step 422.

FIG. 4D shows a flowchart of a method in accordance with one or more embodiments of the invention. The method depicted in FIG. 4D may be used to migrate data to a second storage in accordance with one or more embodiments of the invention. The method shown in FIG. 4D may be performed by, for example, a storage gateway (110, FIG. 1A). Other component of the system illustrated in FIG. 1A may perform the method of FIG. 4D without departing from the invention.

In Step 430, a determination is made that a change in the association between the data category mappings and the data category storage policies associates a different storage policy with the assigned category of Step 402.

For example, all changes in associations may not change a storage policy associated with the assigned category. Only changes that change an association between the storage policies associated with the assigned category may trigger a migration.

In Step 432, a storage specified by the change in the association between the data category mappings and the data category storage policies is identified in response to the determination.

In one or more embodiments of the invention, storage specified by the change is identified based on the data category storage policies. When a data category of data is changed, a change in storage policy for the data changed due to the new data category for the data. For example, as illustrated in FIG. 2B each category may be associated with a different storage plan that has different quality of storage service requirements. The storage may be specified by the change in the association between the data category mappings and the data category storage policies because only certain storages of the system may meet the quality of storage service requirements of each category. Thus, only some storages may meet the quality of storage service requirements of each category.

In Step 434, a copy of the data is stored based on identification of Step 432.

In one or more embodiments of the invention, a copy of the data is stored based on the identification by storing the copy of the data in the storage identified in Step 432.

The method may end following Step 432.

While the methods illustrated in FIGS. 4A-4D have been described with respect to migration of data, the methods illustrated may also be used for replication or other data integrity operations performed by a storage gateway without departing from the invention.

Figure 5A:
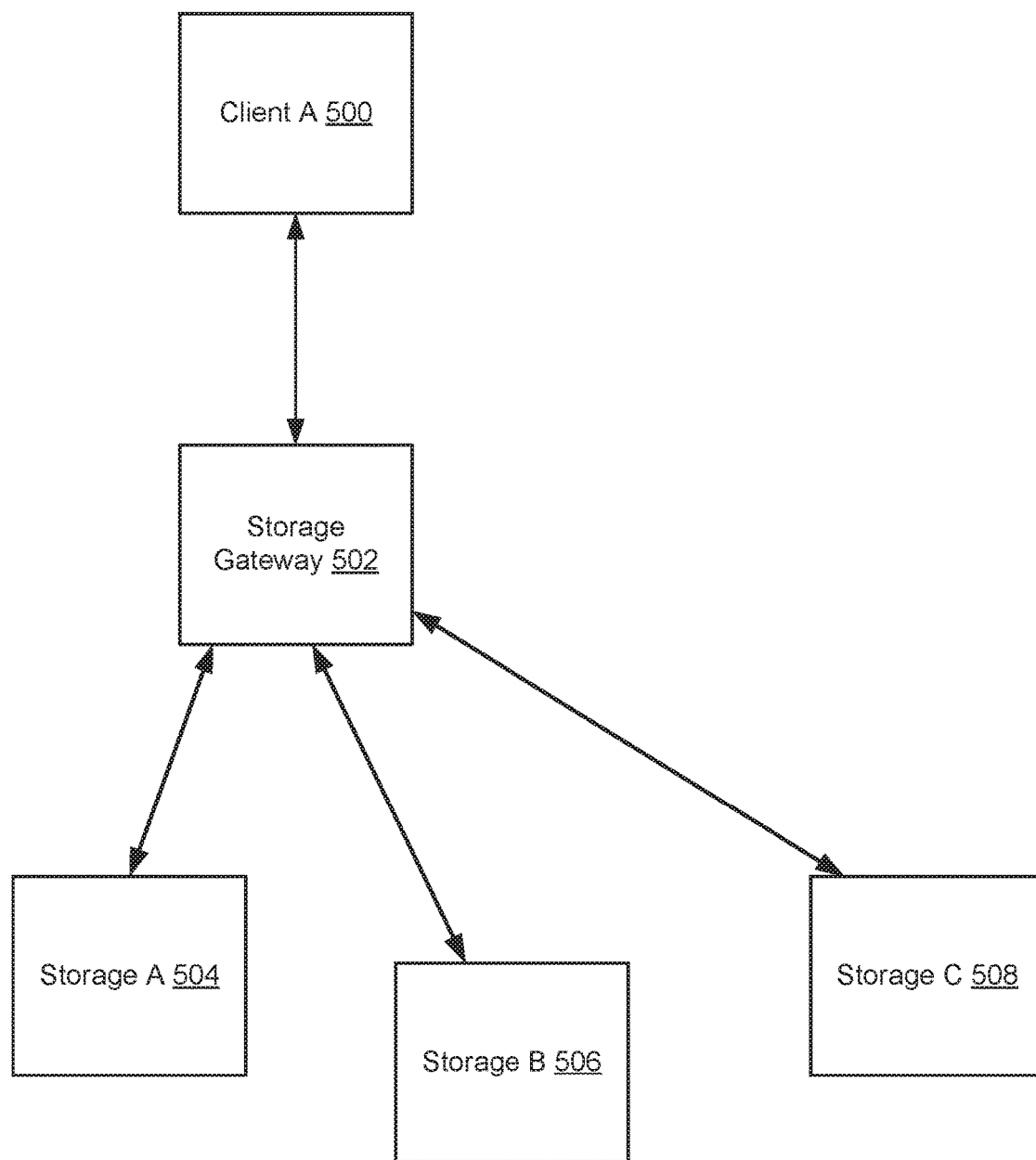
FIG. 5A shows a diagram of an example system at a first point in time.
Figure 5B:
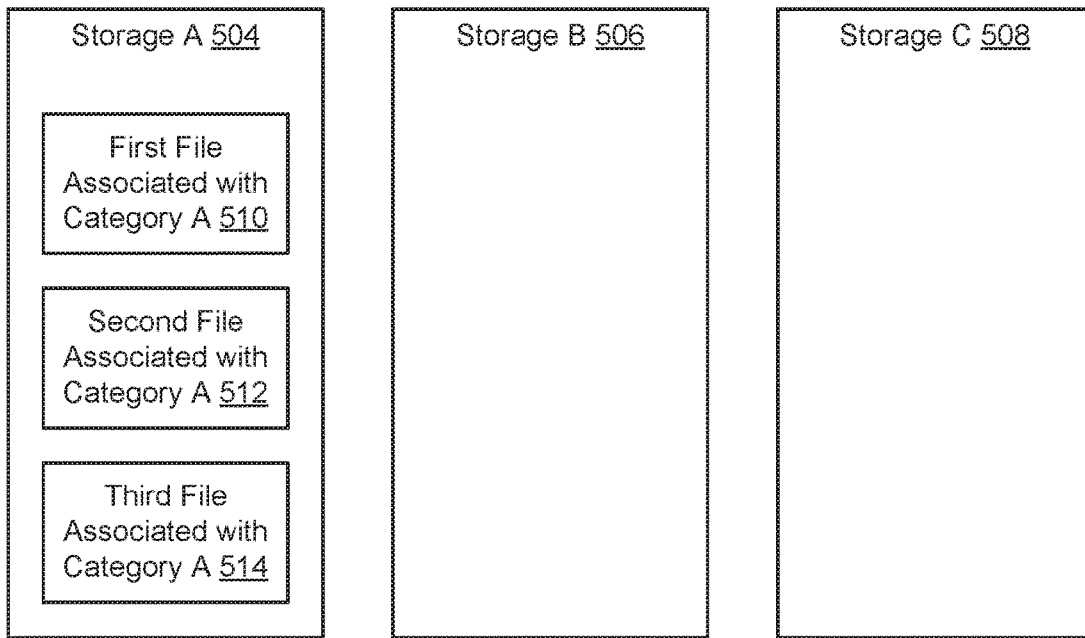
FIG. 5B shows a diagram of data stored in the example system of FIG. 5A at the first point in time.
Figure 5C:
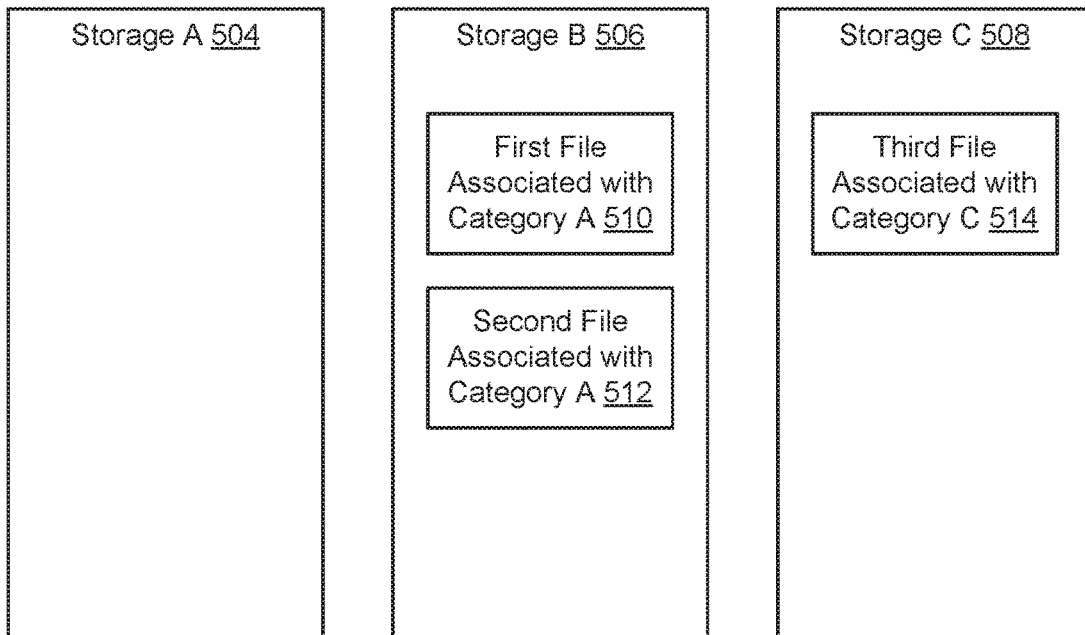
FIG. 5C shows a diagram of data stored in the example system of FIG. 5B at a second point in time.

To further explain embodiments of the invention, a non-limiting example is shown in FIGS. 5A-5C.

Example 1

FIG. 5A shows a diagram of a topology of an example system. The system includes a client (500) operably connected to three storages (504, 506, 508) via a storage gateway (502). The three storages (504, 506, 508) are operably connected to the storage gateway (502) via operable connections.

Each of the storages provides a different quality of storage service. Storage A (504) provides the lowest quality of storage service. Storage B (506) provides a mid-level quality of storage service. Storage C (508) provides a high quality of storage service.

At a first point in time, storages (504, 506, 508) store data as shown in FIG. 5B. Storage A (504) stores three files from the client (500, FIG. 5A). The first two files (510, 512) are word documents from user of the client (500). By virtue of being associated with a user, the files are both categorized as category A files and are stored in storage A (504) having the required quality of storage service. The third file (514) is a database a user of the client (500). By virtue of being associated with a user, the file is categorized as a category A file and is stored in storage A (504) having the required quality of storage service.

At a second point in time, a storage policy for category A files is changed to a mid-level quality of storage service and the third file (508) is re-categorized as a category C file. In response the change in storage policy, the first two files (510, 512) are migrated to storage B (506) as illustrated in FIG. 5C because it has the required quality of storage service. In response to the re-categorization, the third file (514) is migrated to storage C (508).

Thus, the system illustrated in FIGS. 5A-5C is able to migrate files on a macro level rather than having to adjust a storage policy for each data on a granular level.

Example 1 ends.

Figure 6:
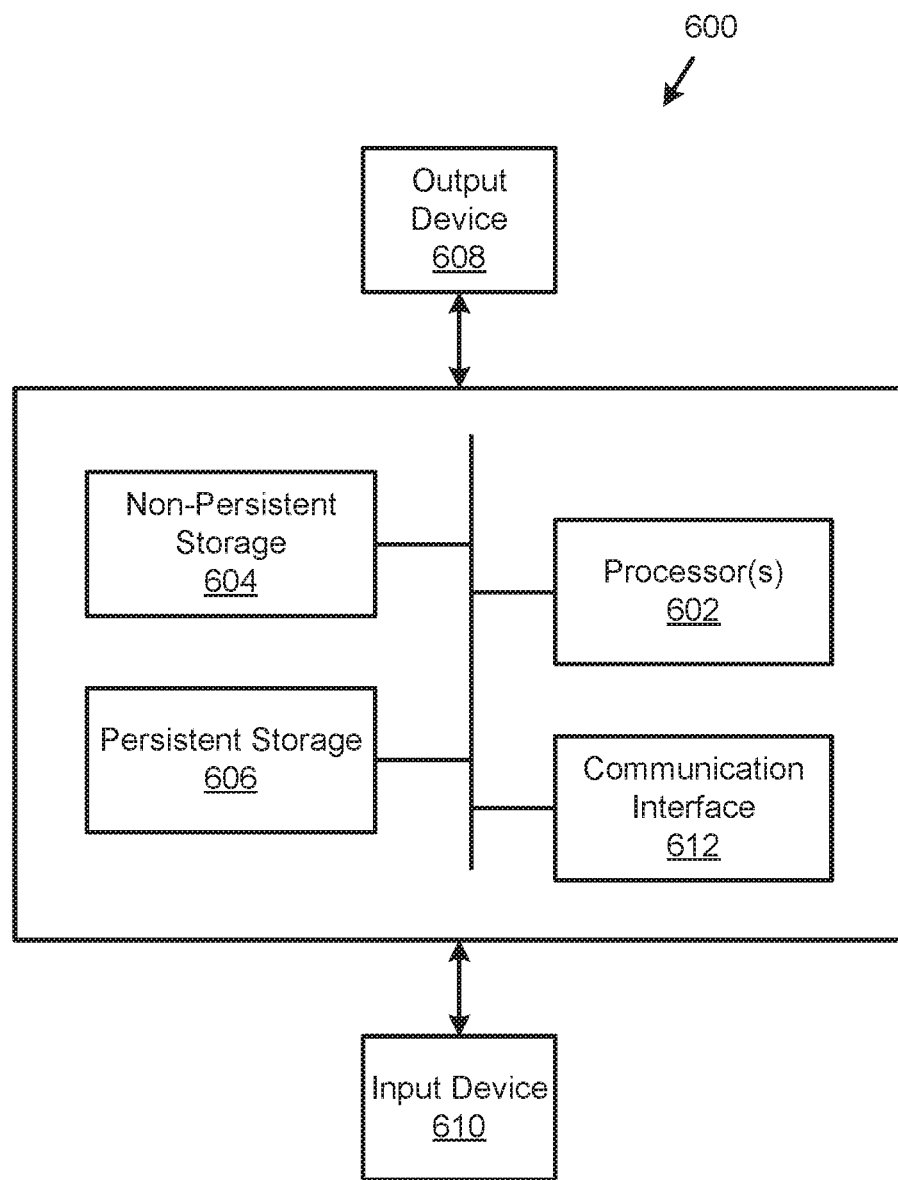
FIG. 6 shows a diagram of a computing device in accordance with one or more embodiments of the invention.

As discussed above, embodiments of the invention may be implemented using a computing device. The system of FIG. 1A may utilize any number of computing devices to provide the functionality described throughout this application. For example, a storage gateway, storage, or other elements of the system may be implemented using computing devices. FIG. 6 shows a diagram of a computing device in accordance with one or more embodiments of the invention. The computing device (600) may include one or more computer processor(s) (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may address the problem of managing data in a networked environment having a dynamic topology that includes multiple storages that are added or removed over time. For such a topology, it is not possible to specify a storage location for data over the storage life of the data. For example, the topology of a network that stores data from clients may change over time due to the addition or removal of storages. Unlike traditional computing devices (e.g., desktop computers) that generally have a fixed amount of unshared storage, a network that stores data may change dynamically. Additionally, the connections between components of the network may also change, e.g., the bandwidth or latency of each connection may change over time. To manage the storage of data in a networked environment, embodiments of the invention provide a method of modifying a dynamic storage policy on a macro level rather than granular level. More specifically, embodiments of the invention may enable large quantities of data to be categorized and the storage policies associated with the data to be changed quickly, efficiency, and in an automated manner.

The aforementioned problem of managing data in a networked environment is uniquely encountered due to the technological environment in which networked storage operates. Due to the rise of geographically distributed storages, client data is increasingly being stored in storages that are being dynamically added or removed throughout the storage life of the data. Unlike traditional internal storages of desktop computers, the quality of storage service provided by storages in a network environment depends on numerous characteristics of the storage including the type of data stored in the storages, the deduplication used by the storages to store the data, the topology of the network, and the computing resources of the storages. Embodiments of the invention may provide a mechanism for changing the quality of storage service provided to different portions of the data stored by a client in the storages. Thus, embodiments of the invention improve the operation of the storage of data in a networked environment by enabling the quality of storage service for any quantity of data to be changed quickly efficiently based on a categorization of the data at the time of storage the specifies the priority of the data for certain scenarios. This capability, in contrast to prior systems that only allowed changes to storage locations on a granular level, enables data stored by clients to be provided with a required quality of storage service. In this manner, clients are able to rely on a minimum expected quality of storage service for the data stored in a network environment.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may enable one or more of the following: i) reduce a cognitive burden on a user by automatically selected the storage/migration/replication location for client data without user intervention, ii) reduce a cognitive burden on a user by automatically categorizing client data as the data is stored so that different data stored by a client can be efficiently migrated/replicated, and iii) reduce a computing resource cost of storing data by enabling a user to rely on being able to migrate/replicate data from a low quality of storage service storage to a high quality of storage service client.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A storage gateway for managing data, comprising:
a persistent storage comprising:
data category mappings, and
data category storage policies; and
a processor programmed to:
obtain a data storage request for data from a client;
assign the data to a first category specified by the data category mappings;
store the data in a first storage based on a storage policy specified by the data category storage policies;
after storing the data in the first storage, migrate the data to a second storage in response to a change in the association between the data category mappings and the data category storage policies.

2. The storage gateway of claim 1, wherein assigning the data to a first category specified by the data category mappings comprises:
identifying a priority for the data provided by the client;
matching the identified priority to a priority associated with the first category out of a plurality of categories of the data category mappings, wherein each of the plurality of categories has a respective priority; and
performing the assigning based on the matched first category.

3. The storage gateway of claim 2, wherein the priority is based on a recovery plan associated with the client.

4. The storage gateway of claim 3, wherein the recovery plan specifies a relative priority of all data of the client managed by the storage gateway.

5. The storage gateway of claim 3, wherein the recovery plan specifies a relative priority of categories of client data managed by the storage gateway.

6. The method of claim 1, wherein the data category storage policies comprise a plurality of policies, wherein each policy of the plurality of policies is associated with a respective category of a plurality of categories specified by the data category mappings.

7. The storage gateway of claim 6, wherein storing the data in the first storage based on the storage policy specified by the data category storage policies comprises:
matching the assigned category to a category of the plurality of categories; and
in response to the match, storing the data based on an association between the matched category and the first storage.

8. The storage gateway of claim 1, wherein the change in the association between the data category mappings and the data category storage policies comprises:
associating the first category with a second storage policy of the data category storage policies,
wherein the first category was associated with a first storage policy when the data was stored in the first storage.

9. The storage gateway of claim 1, wherein migrating the data to the second storage in response to the change in the association between the data category mappings and the data category storage policies comprises:
making a determination that the change in the association between the data category mappings and the data category storage policies associates a second storage policy with the first category,
in response to the determination, identifying that the second storage is specified by the second storage policy; and
storing a copy of the data in the second storage based on the identification,
wherein a first storage is specified by a first storage policy of the data category storage policies.

10. The storage gateway of claim 9, wherein the data is deleted from the first storage after the copy of the data is stored in the second storage.

11. The storage gateway of claim 1, wherein the processor is further programmed to:
migrate second data to the second storage in response to the change in the association between the data category mappings and the data category storage policies.

12. The storage gateway of claim 11, wherein the second data and the data were assigned to the first category before the change in the association between the data category mappings and the data category storage policies.

13. The storage gateway of claim 12, wherein the processor is further programmed to:
not migrate third data to the second storage in response to the change in the association between the data category mappings and the data category storage policies.

14. The storage gateway of claim 13, wherein the third data is not assigned to the first category before the change in the association between the data category mappings and the data category storage policies.

15. The storage gateway of claim 14, wherein the data, the second data, and the third data are associated with the client.

16. The storage gateway of claim 14, wherein the data, the second data, and the third data are owned by the client.

17. A method of operating a storage gateway for managing data, comprising:
obtaining a data storage request for data from a client;
assigning the data to a first category specified by data category mappings;
storing the data in a first storage based on a storage policy specified by data category storage policies;
after storing the data in the first storage, migrating the data to a second storage in response to a change in the association between the data category mappings and the data category storage policies.

18. The method of claim 17, wherein assigning the data to a first category specified by the data category mappings comprises:
identifying a priority for the data provided by the client;
matching the identified priority to a priority associated with the first category out of a plurality of categories of the data category mappings, wherein each of the plurality of categories has a respective priority; and
performing assigning based on the matched first category.

19. A non-transitory computer readable medium comprising computer readable program code, which when executed by a computer processor enables the computer processor to perform a method for operating a storage gateway for managing data, the method comprising:
obtaining a data storage request for data from a client;
assigning the data to a first category specified by data category mappings;
storing the data in a first storage based on a storage policy specified by data category storage policies;

after storing the data in the first storage, migrating the data to a second storage in response to a change in the association between the data category mappings and the data category storage policies.

20. The non-transitory computer readable medium of claim 19, wherein assigning the data to a first category specified by the data category mappings comprises:
identifying a priority for the data provided by the client;
matching the identified priority to a priority associated with the first category out of a plurality of categories of the data category mappings, wherein each of the plurality of categories has a respective priority; and
performing assigning based on the matched first category.

* * * * *